(12) United States Patent
Malloy

(10) Patent No.: US 7,519,627 B2
(45) Date of Patent: Apr. 14, 2009

(54) METHOD FOR AUTOMATIC DELETION SCHEDULING OF THE PLURALITY OF FILES IN MULTI-USER A DIGITAL PLAYBACK SYSTEM

(75) Inventor: William E. Malloy, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 305 days.

(21) Appl. No.: 11/196,302

(22) Filed: Aug. 4, 2005

(65) Prior Publication Data

US 2007/0033232 A1    Feb. 8, 2007

(51) Int. Cl.
*G06F 17/30* (2006.01)
*G06F 17/00* (2006.01)
*G06F 3/00* (2006.01)
*H04N 7/16* (2006.01)

(52) U.S. Cl. ............................ 707/201; 707/1; 707/102; 725/25; 725/61

(58) Field of Classification Search ................. 707/1–2, 707/100, 102, 104.1; 386/127; 725/25, 27, 725/40, 47, 61
See application file for complete search history.

(56) References Cited

U.S. PATENT DOCUMENTS

| | | | |
|---|---|---|---|
| 6,522,833 B1* | 2/2003 | Ando et al. ................. | 386/125 |
| 6,560,651 B2 | 5/2003 | Katz et al. .................. | 709/229 |
| 6,564,005 B1 | 5/2003 | Berstis | |
| 6,614,987 B1 | 9/2003 | Ismail et al. | |
| 7,149,959 B1* | 12/2006 | Jones et al. ............. | 715/500.1 |
| 7,352,957 B2* | 4/2008 | Ando et al. .................. | 386/95 |
| 2002/0040475 A1* | 4/2002 | Yap et al. ...................... | 725/39 |
| 2002/0092021 A1* | 7/2002 | Yap et al. ...................... | 725/55 |
| 2002/0110353 A1* | 8/2002 | Potrebic et al. ................ | 386/46 |
| 2003/0009766 A1* | 1/2003 | Marolda ....................... | 725/97 |
| 2003/0206719 A1 | 11/2003 | Bumgardner et al. | |
| 2003/0229642 A1* | 12/2003 | Kim et al. .................... | 707/100 |
| 2004/0018005 A1* | 1/2004 | Gates et al. ................... | 386/98 |
| 2004/0039723 A1* | 2/2004 | Lee et al. ........................ | 707/1 |
| 2004/0111750 A1* | 6/2004 | Stuckman et al. .............. | 725/89 |
| 2004/0244030 A1* | 12/2004 | Boyce et al. ................... | 725/25 |

(Continued)

FOREIGN PATENT DOCUMENTS

EP    1467372    * 10/2004

(Continued)

OTHER PUBLICATIONS

Claudia Loebbecke et al. "Business Models and Programming Choice Digital Video Recorders Shaping the TV Industry",Proceedings of the Eleventh Americas Conference on Information Systems, Omaha, NE, USA Aug. 11-14, 2005, pp. 1-9.*

(Continued)

*Primary Examiner*—Srirama Channavajjala
(74) *Attorney, Agent, or Firm*—Sughrue Mion, PLLC

(57) ABSTRACT

One embodiment relates generally to managing files. A plurality of users is identified for a digital device. A file on the digital device is identified for access by the plurality of users. A user is logged as having viewed the program in response to the user completing playback of the file.

9 Claims, 12 Drawing Sheets

U.S. PATENT DOCUMENTS

2005/0028212 A1* 2/2005 Laronne et al. ............... 725/86
2005/0246745 A1* 11/2005 Hirsch et al. .................. 725/74
2006/0109854 A1* 5/2006 Cancel ........................ 370/401
2007/0041705 A1* 2/2007 Bontempi .................... 386/83

FOREIGN PATENT DOCUMENTS

| GB | 2346251 | * | 8/2000 |
| JP | 2004-199741 A | | 7/2004 |
| WO | WO 2004/053841 | * | 6/2004 |
| WO | WO 2008/046001 | * | 4/2008 |

OTHER PUBLICATIONS

Digital Video Recorder System, AnyKeeperTM User Manual, Copyright 2001 TechData Co., Ltd., 49 pages.*

* cited by examiner

| Main Menu | | |
|---|---|---|
| | Now Playing List for | All Viewers |
| | Watch Live TV | |
| | Showcases | |
| | Pick Programs to Record | |
| | Messages & Setup | |
| | Special Announcements | |
| | Standby | |
| | | |

| Main Menu | | |
|---|---|---|
| | Now Playing List for | Bill |
| | Watch Live TV | |
| | Showcases | |
| | Pick Programs to Record | |
| | Messages & Setup | |
| | Special Announcements | |
| | Standby | |
| | | |

Delete this recording? — 600

"Recorded Program X"
   Are you done with this program? If you delete it now, there will be more room for programs to be recorded. Or, select Update Viewing Status to note who has watched the program so that the system can make space available when all interested viewers have watched this program:
615 — Update viewing status
605 — Delete this recording now
610 — Don't delete

FIG. 6

Delete this recording? — 700

| For Recorded Program 1 | Viewer 1 | Requested | Viewed |
| | Viewer 2 | Not Requested | |
| | Viewer 3 | Requested | Not Viewed |
| | Viewer 4 | Not Requested | |

| Now Playing List | | | |
|---|---|---|---|
| (1) | Recorded Program #1 | Thu | 10/2 |
| (3) | Recorded Program #2 | Thu | 10/2 |
|  | Recorded Program #3 | Wed | 10/1 |
| (3) | Recorded Program #4 | Tue | 9/30 |
|  | Recorded Program #5 | Tue | 9/30 |
| (!) | Recorded Program #6 | Mon | 9/29 |
| 0 | Recorded Program #7 | Sun | 9/28 |

FIG. 8

METHOD FOR AUTOMATIC DELETION SCHEDULING OF THE PLURALITY OF FILES IN MULTI-USER A DIGITAL PLAYBACK SYSTEM

FIELD

The present invention relates to managing data, and more particularly it relates to automatic deletion scheduling for a multi-user digital playback system.

BACKGROUND

Digital playback systems, such as digital video recorders (DVRs), have become more popular with consumers. DVRs typically interface with a cable or satellite provider and a television set. A DVR typically comes equipped with a hard disk drive that enables a consumer to record programs such as movies, television shows, subscription sports, and other programming as digital files. DVRs are similar to videocassette recorders in that they enable a consumer to time-shift their viewing choices.

However, DVRs offer advantages over conventional video cassette recorders. For instance, DVRs typically can record approximately one hundred hours of programming versus eight hours on a videocassette. Manufacturers also are continuously introducing DVRs with larger and larger disk drives to increase their programming capacity. Further, the programming recorded on the hard disk of the DVR is not subject to the degrading effects during playback as compared to the videocassette tape.

Despite the ever-increasing sizes of disk drives, recorded programs (or files) on a DVR have to be eventually deleted to make room for new programming. For a single user of a DVR, this is typically not a problem of reviewing the recorded programs and deleting selected programs. However, when several individuals, e.g., members of a family, share a DVR, the decision to delete a recorded program becomes more problematic. For instance, the typical DVR does not have an equivalent function to the Microsoft Windows™ "Recycle Bin", that is, once a program is deleted, it cannot be recovered. Thus, as a matter of course, the individuals sharing a DVR, should meet and decide as a group which recorded programs are to be deleted. This meeting of the individuals may be inconvenient as most individuals have varying schedules.

SUMMARY

One embodiment relates generally to a method for automatically scheduling the deletion of files on a digital playback system. A plurality of users of the digital playback system are logged. A file on the digital playback system to be accessed is identified by the plurality of users. When at least one of the plurality of users has accessed the file, it is logged. Deletion of the identified file is then scheduled based on when the at least one of the plurality of users has completed accessing the file.

Another embodiment pertains generally to a digital playback system configured to automatically schedule deletion of files representing recorded programming. The system comprises an interface configured to receive programming and a digital storage device. The digital storage device is coupled to the interface and configured to store at least one file for programming selected by at least one user. The digital storage device is also configured to identify a plurality of users interested in viewing the file representing the received programming recorded, and determine a status of when each user from the plurality of users has viewed the file. When at least some of the users interested in viewing the file have viewed the file, the digital storage device schedules deletion of the file.

Yet another embodiment relates generally to a computer readable storage medium on which is embedded one or more computer programs. The one or more computer programs implement a method of automatically scheduling deletion of a recorded program. The one or more computer programs comprising a set of instructions for identifying a plurality of users for the digital playback device, recording a plurality of programs on the digital playback system, and identifying a file to be viewed by a subset of the plurality of users. When the subset of users has viewed the file, it is logged and deletion of the file is scheduled based on when the subset of users has viewed the file.

Additional features of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

FIGS. 5A-5F illustrate a user interface for selecting the retention criteria for a recorded program in accordance with yet another embodiment.

FIG. 6 illustrates an exemplary user interface that may be displayed when a user has viewed a recorded program in accordance with yet another embodiment.

FIG. 7 illustrates an exemplary user interface that may be displayed in response to selecting viewer status menu option in accordance with yet another embodiment.

FIG. 8 illustrates an exemplary user interface summarizing the deletion status of the recorded programs in accordance with yet another embodiment.

DESCRIPTION OF THE EMBODIMENTS

Embodiments of the invention generally relate to a system and method for managing a multi-user digital playback system. For purposes of illustration, various embodiments of the present invention will be described with reference to a digital playback system that is implemented as a digital video recorder ("DVR"). More particularly, in some embodiments, a DVR may be configured to determine the number of users using the DVR and identify the users using the DVR. The DVR may also be configured to identify which recorded programs are going to be viewed by the users. When the playback of a recorded program concludes, the DVR may be further configured to log which users have viewed the recorded program. In some embodiments, the DVR may maintain a data structure to monitor which users have viewed a recorded program or monitor users that may be interested in viewing a recorded program. Once all interested viewers have viewed the program, the recorded program may be marked or indicated eligible for deletion. Accordingly, user-friendly methods of tracking the viewing status of users for recorded programs and for controlling deletion of recorded programs are provided.

Figure 1:
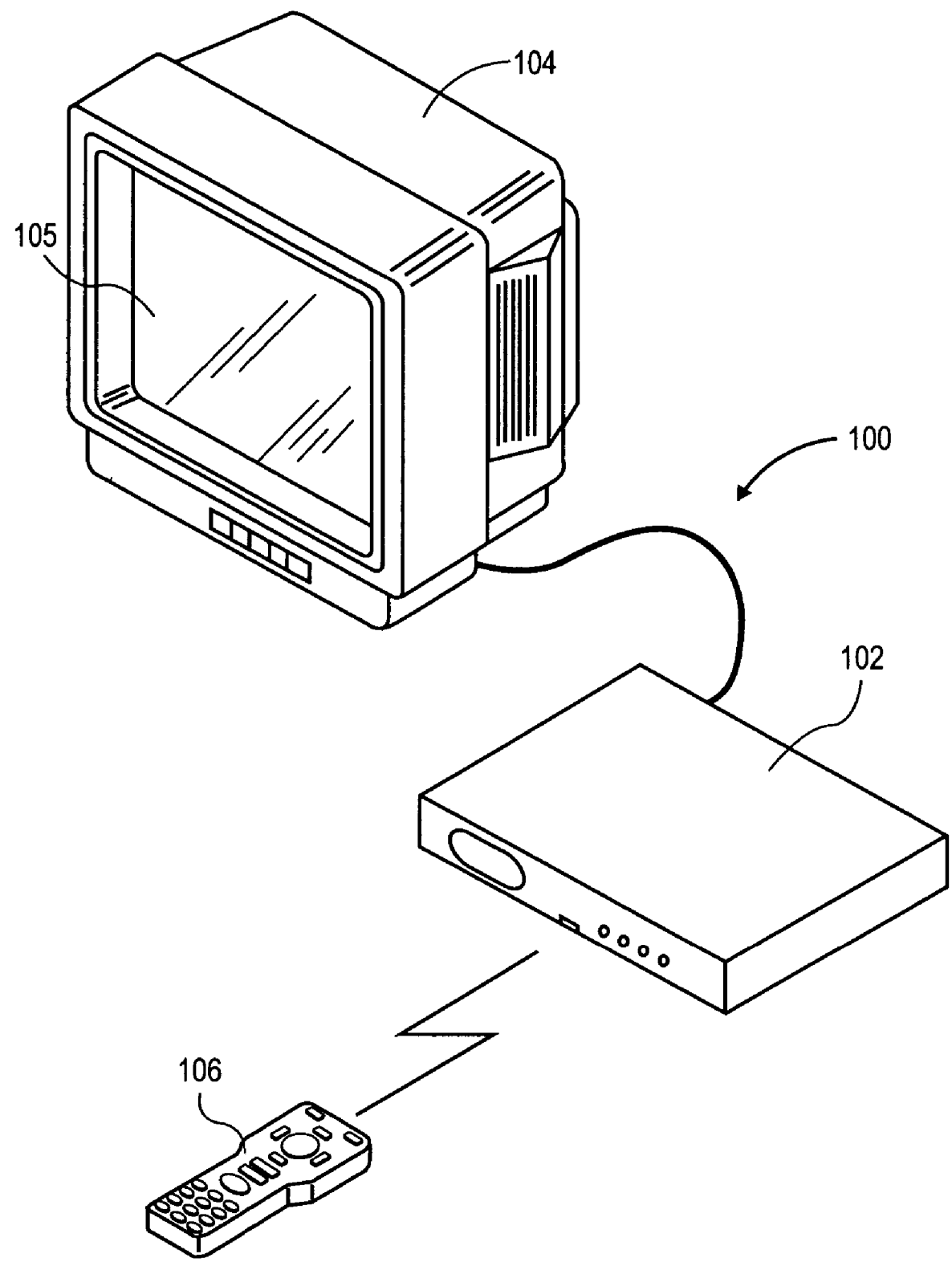
FIG. 1 illustrates a system that is consistent with an embodiment of the invention.

FIG. 1 illustrates an exemplary system in accordance with an embodiment of the invention. It should be readily apparent to those of ordinary skill in the art that the system 100 depicted in FIG. 1 represents a generalized schematic illustration and that other components may be added or existing components may be removed or modified.

As shown in FIG. 1, a system 100 may be a set-top box providing, with minimal economic costs for hardware to the user, access to the Internet. System 100 includes a digital video recorder (DVR) 102, which is preferably sized to fit in typical entertainment centers. In some instances DVR 102 may be referred to as a personal video recorder. In some embodiments, DVR 102 may enable a user to record programs and to automatically schedule deletions based on which users have viewed programs. Additionally, in other embodiments, DVR 102 may provide other common functions such as, for example, serving as an answering machine, transmitting or receiving facsimile transmissions, providing voice mail facilities, storing audio files, or providing storage of digital files.

DVR 102 is connected to television 104 for display of graphical information on display screen 105. DVR 102 may provide its signals, such as its audio and video signals, to television 104 as either analog or digital signals. Television 104 may be any suitable television, although color televisions with an S-Video input are currently known to provide better presentations of the graphical information. DVR 102 may be connected to television 104 through a standard coaxial cable connection. A remote control unit 106 allows a user to interact with and control DVR 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 2:
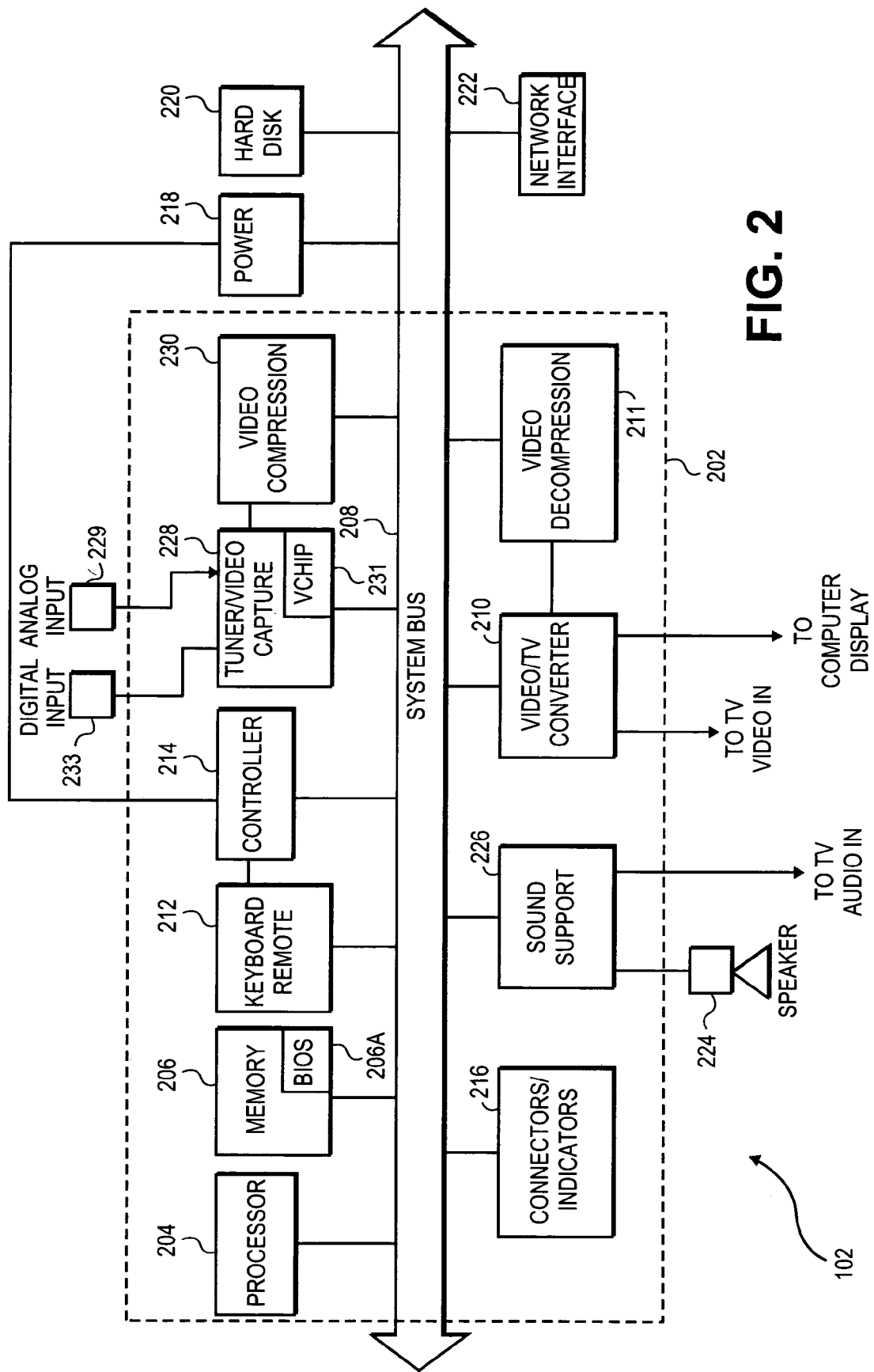
FIG. 2 illustrates a more detailed block diagram of the DVR depicted in FIG. 1 in accordance with another embodiment of the invention.

FIG. 2 illustrates a more detailed block diagram of the DVR 102 depicted in FIG. 1 in accordance with another embodiment of the invention. It should be readily apparent to those of ordinary skill in the art that the DVR 102 depicted in FIG. 2 represents a generalized schematic illustration and that other components may be added or existing components may be removed or modified.

As shown in FIG. 2, the DVR 102 includes a motherboard 202 containing at least one processor 204 and memory 206 connected to system bus 208. Processor 204 is preferably at least a 486 processor operating at or above 100 MHz. Memory 206 includes read only memory (ROM) 206a containing a basic input/output services (BIOS) routine and may include cache memory and/or video RAM.

The Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Video decompression circuitry 211 decompresses video data before it is sent to video/TV converter 210. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons may transmit signals corresponding to keystrokes on an infrared keyboard. Thus, remote control unit 106 has a subset of the functions provided by an infrared keyboard. Connectors/indicators 216 on motherboard 202 provide the connections and indicators on DVR 102 described above.

The tuner/video capture circuitry 228 couples DVR 102 to a source of programming. For example, tuner/video capture circuitry 228 may receive television signals, which may be digital or analog. Tuner/video capture circuitry 228 may receive digital signals, such as digital television or high definition (HD) television, via digital interface 233 or analog signals via analog interface 229. These signals are well known to those skilled in the art for programming provided from over-air television, cable television, and satellite television. Of course, DVR 102 may be coupled via interfaces 229 or 233 to another device that serves as a program source, such as a digital video disk player, a videotape player, a compact disk player, an mp3 player, and the like. For example, interfaces 229 and 233 may be implemented using well known connector types, such as RCA, Bayonet Neill Concelman ("BNC"), F-connectors, digital visual interface ("DVI"), and the like. Other known receivers, such as a receiver for satellite television, may also be implemented with circuitry 228. Tuner/video capture circuitry 228 separates the incoming television signals into audio signals and video signals. If needed, the video signals are converted from analog to digital signals, and then may be compressed, via video compression circuitry 230. For example, as shown in FIG. 2, digital satellite signals may be compressed by video compression circuitry 230. Of course, in other embodiments, televisions signals, such as digital satellite signals may be formatted such that they may bypass video compression circuitry 230. In the described embodiment, video compression circuitry 230 is Moving Pictures Expert Group ("MPEG")-2 compression circuitry, although one skilled in the art will realize that other types of compression, such as MPEG-1, may also be used. Tuner/video capture circuitry 228 may also include a V-chip 231, or other type of screening circuitry.

The sound support 226 includes circuitry to convert audio signals from analog to digital, and vice versa. Sound support 226 also includes circuitry to compress and decompress digital audio signals. Audio signals may be sent from sound support 226 to speaker 224 and/or the audio in connection of television 104.

External to motherboard 202 in the depicted example are power supply 218, hard disk 220, and network interface 222. External power supply 218 is a conventional power supply except that it receives a control signal from controller 214 which effects shut down of all power to motherboard 202, hard drive 220, and network interface 222. In some recovery situations, removing power and rebooting is the only guaranteed method of resetting all of these devices to a known state. Thus power supply 218, in response to a signal from controller 214, is capable of powering down and restarting DVR 102.

Hard disk 220 contains operating system and applications software for DVR 102. Data, such as television program data, may also be stored on hard disk 220. Network interface 222 embodies the hardware and software to allow DVR 102 to couple to a network, such as the telephone network, a local area network, a wide area network, or some other form of data network, such as the Internet. For example, network interface 222 may be inserted into a slot mounted sideways on motherboard 202 may be a 33.6 kbps modem supporting the V.42bis, V34bis, V.34, V.17 Fax, MNP 1-5, and AT command sets. Of course, network interface 222 may include other types of devices, such as an Ethernet interface, a wireless network interface, and the like. Accordingly, DVR 102 may also receive programming from a source, such as a website, via network interface 222.

Controller 214 may be implemented using one or more of Intel's 805x family of controllers. In other embodiments, other controllers from other manufacturers (e.g., Motorola, Harris Semiconductor, etc.) may be used. Controller 214 is continuously powered and, when DVR 102 is turned on, monitors the system for a periodic "ping" indicating that DVR 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off DVR 102 and signals that service is required through indicators 216. Thus, DVR 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Embodiments of the invention may be implemented by the DVR 102. More particularly, one embodiment may be an instance of a computer program executed by the processor 204. Accordingly, functionality described above and in greater detail below may refer to the DVR 102 and the processor 204 interchangeably.

As noted, the DVR 102 may be configured to provide user-friendly methods of tracking the viewing status of users for recorded programs and for controlling deletion of recorded programs are provided. For example, the following figures illustrate some simple modifications to known menu systems in order track the viewing status of users and control when recorded programs are deleted. One skilled in the art will recognize that a user may easily navigate through these menu systems based on input from infrared remote control 106, infrared keyboard, wired/wireless keyboard, or wired/wireless mouse.

The DVR 102 may also be configured to track the viewing status of users and control the deletion of programs by other mechanisms. For example, the DVR 102 could estimate or guess who is watching a given program based on when it is being watched. As part of this algorithm, children may be assumed to primarily watch programs in the afternoon, while adults may be assumed to watch programs in the late evening. Such an algorithm may be implemented using a computer program executed by the processor 204 that records viewing patterns and makes inferences. The DVR 102 may also allow users to explicitly specify a pre-selected guess as to which viewers have just viewed a program and provide a pre-filled menu, which can be confirmed or modified upon completion of viewing for a program.

In other embodiments, the DVR 102 may be configured to accept input from an identification device, such as a radio frequency identification device (RFID), a card with a magnetic strip, a device with a bar code, or other similar identification device. For example, users in a household may possess identification devices that are recognized by the DVR 102 and which automatically identifies them when they are present in a room or near the DVR 102. The DVR 102 may also include a reader, such as a barcode reader, for such identification purposes to track the users who were present during the viewing of a program. The DVR 102 may then provide a pre-filled menu, which can be confirmed or modified upon completion of viewing for a program. For example, the DVR 102 may provide a menu or screen that indicates which users have been recognized and may request confirmation, e.g., via input from the infrared remote control 106, infrared keyboard, wired keyboard, or wired mouse.

As another example, the DVR 102 or similar device may be configured to support multiple outputs to televisions, computer monitors, and the like. In such a situation, the DVR 102 may then be configured to determining user interest and track user viewing based on configuration information about who are the most common users of a specific output and when these users view programs at a specific output. For example, if a television is in a user's bedroom, then the DVR 102 may assume that programs viewed at this location and entries at this location may be for that particular user. Of course, prior to deleting a program, the DVR 102 may use various pre-filled menus and request confirmation from that user.

Figure 3:
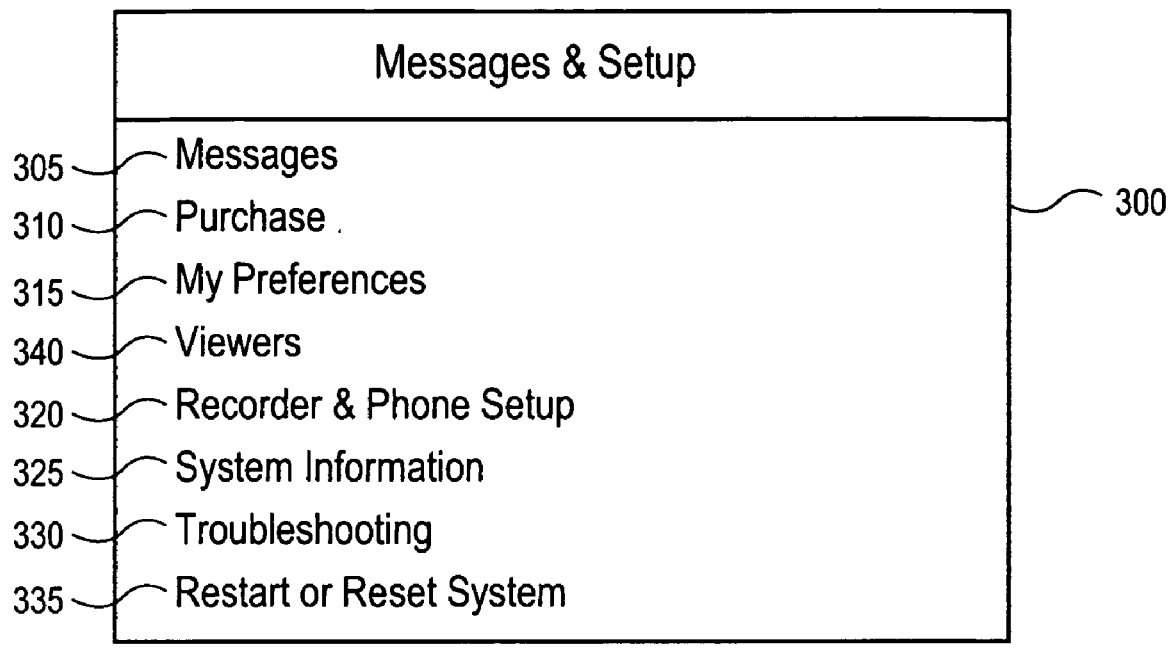
FIG. 3 illustrates a user interface that may be displayed to a user during a set-up phase of the DVR in accordance with another embodiment of the invention.

FIG. 3 illustrates a user interface 300 that may be displayed to a user during a set-up phase of the DVR. It should be readily apparent to one of ordinary skill in the art that FIG. 3 is an illustrative example and that existing user interface elements may be modified or deleted or new user interface elements may be added.

As shown in FIG. 3, the DVR 102 may display the user interface 300 during the installation and initialization of the DVR. As with conventional set-up menu screens associated with DVRs, user interface 300 includes menu options for messages 305, purchases 310, preferences 315 recorder & phone setup 320, system information 325, troubleshooting 330, and restart & reset system 335.

However, unlike conventional DVR, the user interface 300 includes a "viewers" menu option 340 in one embodiment. The "viewers" menu option 340 may be configured to provide a mechanism for individuals (or users) to be entered into the DVR 102. When a user selects the "viewers" menu option 340, the DVR 102 may generate a second user interface for the user to enter the names (or identity) of the individuals using the DVR 102, as shown in FIG. 4.

Figure 4:
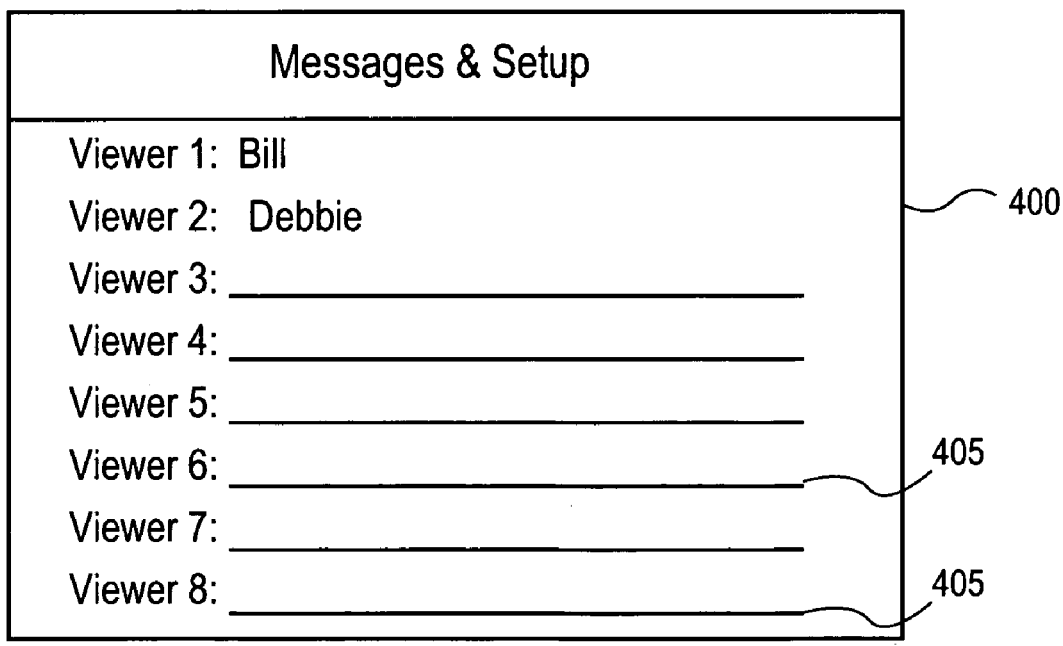
FIG. 4 illustrates an exemplary user interface in accordance with another embodiment of the invention.

FIG. 4 illustrates an exemplary user interface 400 in accordance with another embodiment of the invention. It should be readily apparent to one of ordinary skill in the art that FIG. 4 is an illustrative example and that existing user interface elements may be modified or deleted or new user interface elements may be added.

As shown in FIG. 4, the DVR 102 may display user interface 400, which displays a list of potential users for the DVR 102. Although FIG. 4 shows the number of potential viewers as eight, other embodiments have more users depending on the number of potential viewers a manufactured desired to support. For embodiments with larger number of potential viewers, a scrollable list may be implemented to accommodate the number of users.

A user may select a viewer using the cursor keys on the remote 106. Once the viewer is selected, the DVR 102 may highlight the name field 405. Subsequently, a user may use the number keys to enter the name of the individuals slated for the DVR 102. In some embodiments, using the alphabet system associated with telephones, alphabet characters may be selected for entry.

FIGS. 5A-5F illustrate the user interface for selecting the retention criteria for a recorded program in accordance with yet another embodiment. It should be readily apparent to one of ordinary skill in the art that FIGS. 5A-F are illustrative examples and that existing user interface elements may be modified or deleted or new user interface elements may be added.

Figure 5A:
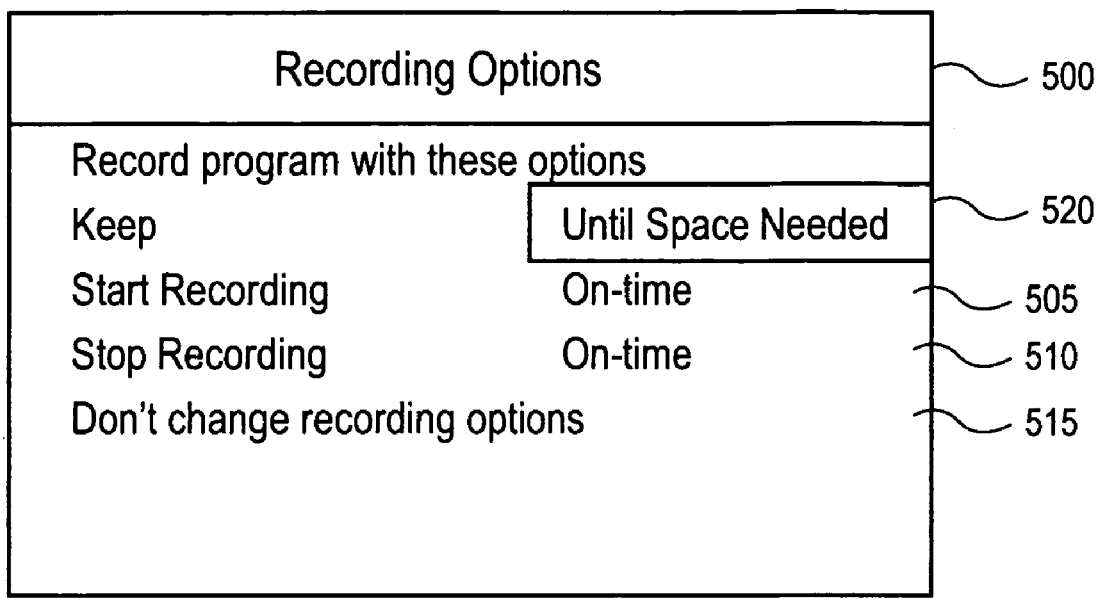

As shown in FIG. 5A, the DVR 102 may display the user interface 500 when a user initiates recording a selected program. More particularly, a user may activate a recording event for a selected program. As part of the process of specifying the recording event, the DVR 102 may generate user interface 500 after the program has been selected. User interface 500 includes a start recording field 505, a stop recording field 510, and a menu option 515 for altering the recording options. Start recording field 505 may indicate when to start recording the selected program. In some embodiments, an option may be available to begin recording a minute earlier. The stop recording field 505 indicates when DVR 102 ceases recording the selected program.

Figure 5B:
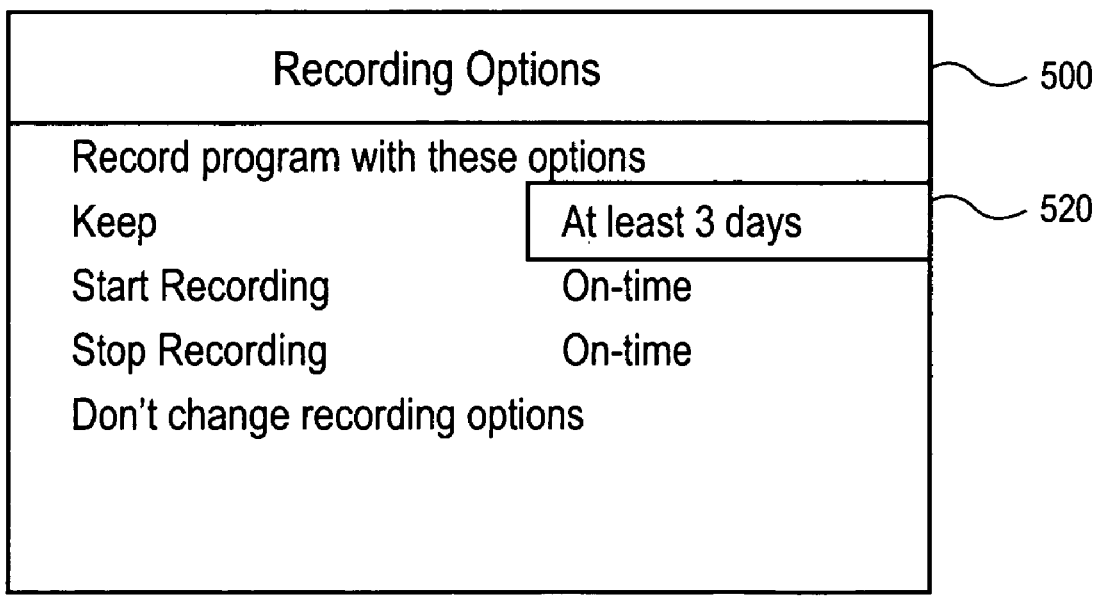
Figure 5C:
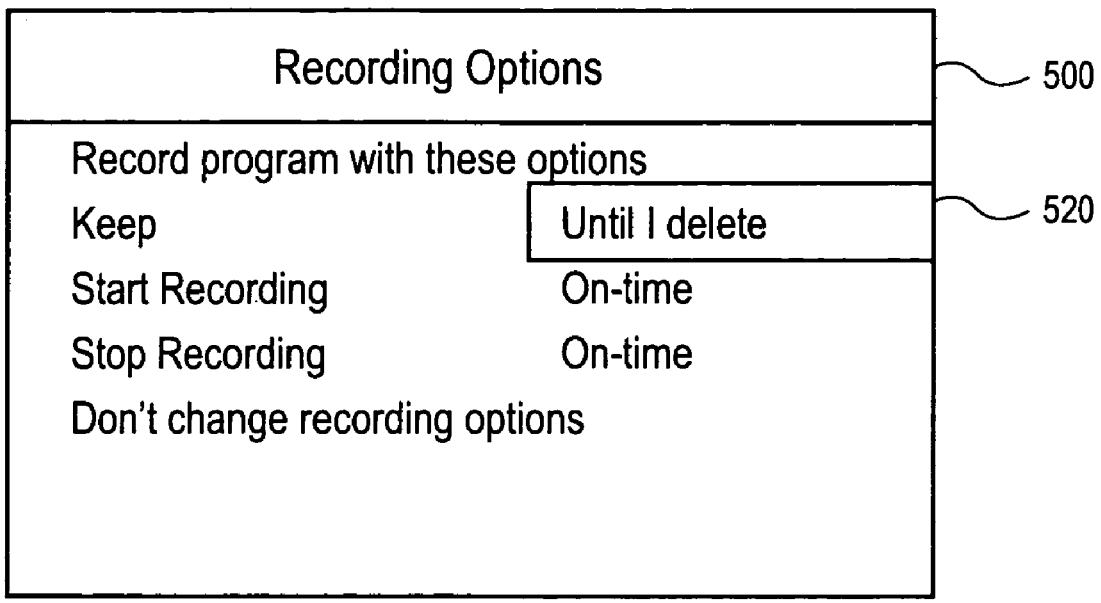
Figure 5D:
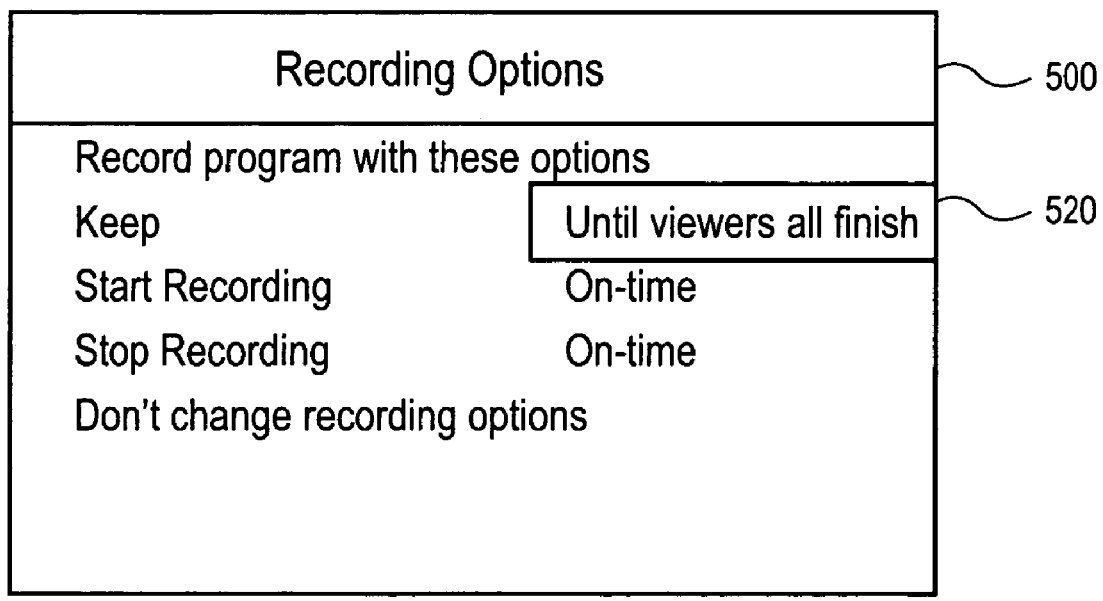

User interface 500 also includes a keep field 520. The keep field 520 may indicate the deletion criterion for the recorded program. In some embodiments, the keep field 520 may have several options. As shown in FIG. 5A, the keep field 520 indicates that the recorded program is to be deleted when space on the disk drive 220 is needed. As shown in FIG. 5B, the keep field 520 indicates that the recorded program is to be deleted three days after the selected program is recorded. In other embodiments, the time interval may be a user-defined variable. As shown in FIG. 5C, the keep field 520 indicates that the recorded program is to be directly deleted by the user. As shown in FIG. 5D, the keep field 520 indicates that the recorded program is to be eligible for deletion when all viewers have viewed the selected program. In addition, when a user has made this "until all viewers" selection, the DVR 102 may then proceed with displaying a viewing status menu, such as the one shown with reference to FIG. 7. In some embodiments, this allows the user to dynamically define for the DVR 102 what is considered the set of "all" users. One skilled in the art will also recognize that the DVR 102 may be configured to provide sets or groups of users, such as parents, children, teenager, etc., and that the recording options may be specific to a particular set or group. In other embodiments, a user may scroll through the options shown in FIGS. 5A-D by using the cursor keys on the remote 106.

When a user selects the option for keeping the recorded program until all viewers have viewed the program, the DVR 102 may create a second data structure, e.g., a bit map, and associate this second data structure with the recorded program. This data structure may be correlated to the number of individuals entered through user interface 400. For example, bit position one may indicate viewer 1 and so forth. Thus, when one of the users has viewed the recorded program, the bit position may be cleared (or set depending on the initial setting for the second data structure). For instance, if viewer #4 (shown in FIG. 4) has viewed the recorded program, bit position four may be cleared (or set) indicating that viewer #4 has viewed the program.

As shown in FIGS. 5E-F, the DVR 102 may also display the user interface 530 as an initial or main menu to assist the users in selecting recorded programs that they may be interested in viewing. In particular, as part of the process of specifying the recording event, the DVR 102 may generate user interface 530 as an initial or main menu that allows a user to select a "Now Playing List." The DVR 102 may provide such a menu to show either all recorded programs, or to show programs marked as being of interest to a particular user. As shown in FIG. 5E, the user interface 530 may include a user field 535. In some embodiments, user interface 520 may be set to a default of "All Viewer" to provide an inclusive list of recorded programs. A user may scroll through options of the "Now Playing List" to select his/her respective playing list. For example, as shown in FIG. 5F, the user has selected the "Now Playing List" for "Bill." Of course, other users, such as "Debbie," may have their list provided as a selection as well. One skilled in the art will recognize that other menu styles are possible for the user interfaces shown in FIGS. 5A-F. For example, the DVR 102 may provide one or more menu levels to show registered users, allow the selection of multiple users, or allow the selection of all recorded programs regardless of the indicated interest by the users. Hence, embodiments of the present invention can present available recorded programs based on a variety of criteria including user identity or interest.

FIG. 6 illustrates an exemplary user interface 600 that may be displayed when a user has viewed a recorded program. It should be readily apparent to one of ordinary skill in the art that FIG. 6 is an illustrative example and that existing user interface elements may be modified or deleted or new user interface elements may be added.

As shown in FIG. 6, DVR 102 may be configured to display user interface 600 at the conclusion of a playback of a selected recorded program. User interface 600 provides options for a user to either delete the recorded program 605, do not delete the program 610 or to update the viewing status 615. Selecting the menu option 605, the DVR 102 is configured to irreversibly delete the recorded program from the hard disk 220. Selecting the menu option 610, the DVR 102 is configured not to delete the recorded program.

In selecting menu option 615, the DVR 102 may be configured to generate user interface 700 as shown in FIG. 7. User interface 700 may be configured to display the name of the recorded program in the name field 705. The name field 705 may also include additional information about the recorded program such as the channel the program was recorded from, the time of the original programming, etc. User interface 700 may be configured to display the users programmed for the DVR 102 in the user field 710. Associated with the user, the user interface 700 includes an interest field 715 and a viewed field 720. The interest field 715 may be configured to indicate whether the viewer is interested in viewing the requested program. The viewed field 720 may be configured to indicate whether the user has viewed the recorded program. It should be readily apparent to one of ordinary skill in the art that FIG. 7 is an illustrative example and that existing user interface elements may be modified or deleted or new user interface elements may be added.

FIG. 8 illustrates an exemplary user interface 800 summarizing the deletion status of the recorded programs. It should be readily apparent to one of ordinary skill in the art that FIG. 8 is an illustrative example and that existing user interface elements may be modified or deleted or new user interface elements may be added.

As shown in FIG. 8, user interface 800 may be configured to display the recorded files of the programs saved on the DVR 102 in the program name field 805. Associated with the name of the program is the day when the program was recorded as well as the date of the program.

User interface 800 may also be configured to display a deletion status field 810. Icons may represent the recording status for the associated program. For instance, the icon 811 may present that one interested viewer has yet to view recorded program #1. Generally, an icon that is characterized as number surrounded by parentheses indicates the number of interested users that have not yet viewed the program. The icon 812 may indicate that the associated program cannot be deleted. The icon 813 and 814 may indicate that the associated programs may be deleted.

Figure 9:
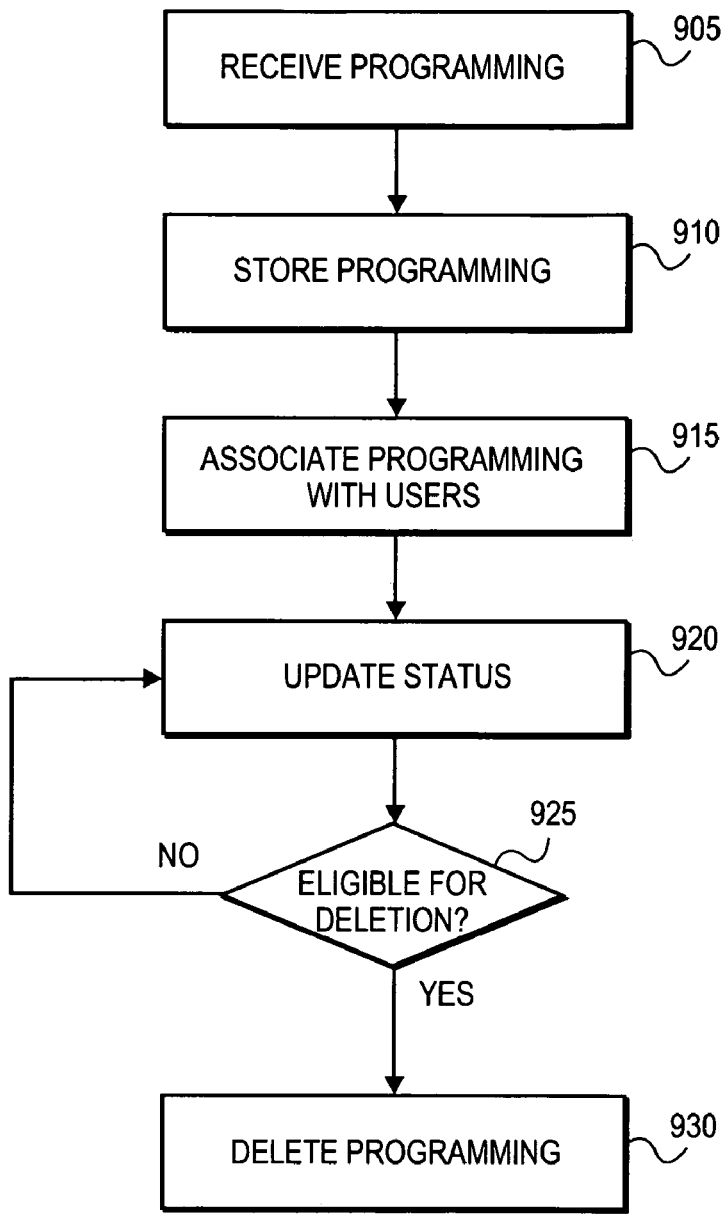
FIG. 9 illustrates a flow diagram implemented by the DVR in accordance with yet another embodiment.

FIG. 9 illustrates a flow diagram 900 implemented by the DVR 102 in accordance with yet another embodiment of the invention. It should be readily apparent to those of ordinary skill in the art that the flow diagram 900 depicted in FIG. 9 represents a generalized illustration and that other steps may be added or existing steps may be removed or modified. In general, flow diagram 900 illustrates a general process for automatically scheduling the deletion of programming that has been recorded on DVR 102. One skilled in the art will recognize that programming provided by DVR 102 may be in the form of video, audio, a combination thereof, or other type of media. As noted, DVR 102 may automatically schedule the deletion of a recorded program based on which users have viewed or accessed the program. One example of the process for automatic deletion scheduling by DVR 102 will now be described.

In step 905, the DVR 102 may receive the programming. For example, as noted above, the DVR 102 may include tuner/video capture circuitry 228 and may receive the programming in various television signals or other signals via interfaces 229 or 233. Alternatively, the DVR 103 may receive the programming in the form of a download or file via network interface 222, for example, from a network such as the Internet.

In step 910, the DVR 102 may store the programming that is to be recorded. For example, the DVR 102 may store the programming as one or more files on hard disk 220. Of course, the DVR 102 may be coupled to another device, such as an external disk drive or computer with storage, and store the programming remotely. In addition, the DVR 102 may update user interface 800.

In step 915, the DVR 102 may associate any recorded programming with one or more users. For example, the DVR 102 may receive data about the programming, such as programming guide information that indicates the content and classification of the programming. The DVR 102 may then select one or more users that are likely to be interested in viewing the programming that it has recorded. One example of a process for entering users in the DVR 102 is described with reference to FIG. 10 below.

Hence, the DVR 102 may associate programming with some or all of the users configured in the DVR 102. For example, a recorded cartoon program may be automatically associated with the users that are children. Programming for mature or adult audiences may be associated with users that are at least a certain age. In addition, the DVR 102 may update the "Now Playing List" for each of the users as they are associated with programming. Of course, one skilled in the art will recognize that users may be manually associated with programming.

In step 920, the DVR 102 monitors and updates the status of its recorded programming. For example, the DVR 102 may track and monitor which users have viewed or accessed particular programming. As noted above, user interfaces 700 and 800 may be browsed by the users to view the current status of a program. One example of a process for updating the status of a program is also provided with reference to FIG. 11.

In step 925, the DVR 102 determines whether programming is eligible for deletion. For example, the DVR 102 may refer to various recording options selected for the programming, such as those described with reference to FIGS. 5A-5D. One example of a process for a user to log in and update the viewing status of recorded programming is described with reference to FIG. 12. The DVR 102 may also determine whether programming is eligible for deletion based on the users browsing through a menu, such as user interface 600. If the programming is not eligible for deletion (e.g., one or more users are still interested in viewing the programming), then processing may repeat, for example, at step 920. If the programming is eligible for deletion, then processing may flow to step 930.

In step 930, the DVR 102 automatically schedules the applicable programming for deletion. The DVR 102 may schedule the deletion of programming at various times based on one or more factors. For example, as noted above, users of the DVR 102 may specify one or more recording options, such as those illustrated in FIGS. 5A-5D that indicates a desired timeframe for deleting programming. Of course, prior to deleting programming, the DVR 102 may request confirmation from one or more of the users. The DVR 102 may then delete files that correspond to the programming, for example from hard disk 220, using well known techniques.

Figure 10:
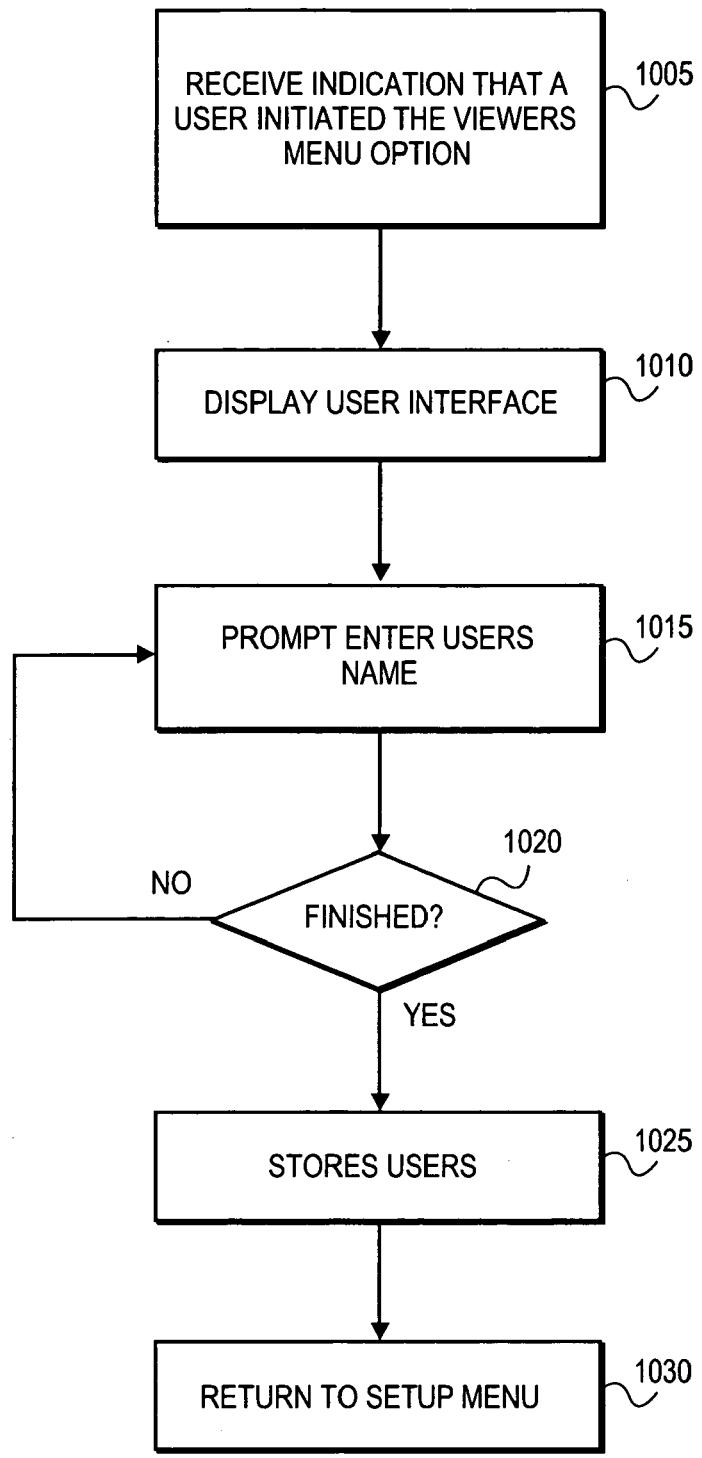
FIG. 10 illustrates a flow diagram for managing one or more users of the DVR in accordance with yet another embodiment.

FIG. 10 illustrates a flow diagram 1000 implemented by the DVR 102 in accordance with yet another embodiment of the invention. It should be readily apparent to those of ordinary skill in the art that the flow diagram 1000 depicted in FIG. 10 represents a generalized illustration and that other steps may be added or existing steps may be removed or modified. In general, flow diagram 1000 illustrates a process for entering and storing names of various users. As noted, DVR 102 may use this information to track which users may be interested in viewing a particular program or track which users have viewed a program. One example of entering and storing user(s) into DVR 102 will now be described.

As shown in FIG. 10, in step 1005, the DVR 102 may receive an indication that a user of the DVR 102 has selected the Viewers 340 (see FIG. 3) menu option from the user interface 300. The user may have prompted the DVR 102 to display the user interface 300 by activating a button a remote control for the DVR 102. In other embodiments, a wired/wireless keyboard may be coupled to DVR 102 and used to activate this particular menu option.

In step 1010, the DVR 102 may display user interface 400 in response to the activation of the Viewers 340 menu option. An example of such an interface is shown in FIG. 4. In step 1015, the user may be prompted to enter one or more user names (or identifiers). For example, the DVR 102 may display a blinking cursor at the first available place where a name can be entered. At this point, the user may enter a name by using the remote control (or a keyboard or some other input device).

When the user finishes entering a name, the DVR 102 may display a dialog box querying the user whether or not he wants to add additional name(s), in step 1020. If the user indicates that he is not finishing entering additional name(s), the DVR may return to the processing of step 1015. Otherwise, if the user has completed entering name(s), the DVR 102 may be configured to store the entered name(s) for future processing by the DVR 102. Subsequently, the DVR 102 may be configured to return to user interface 300 to wait for future action by the user.

Figure 11:
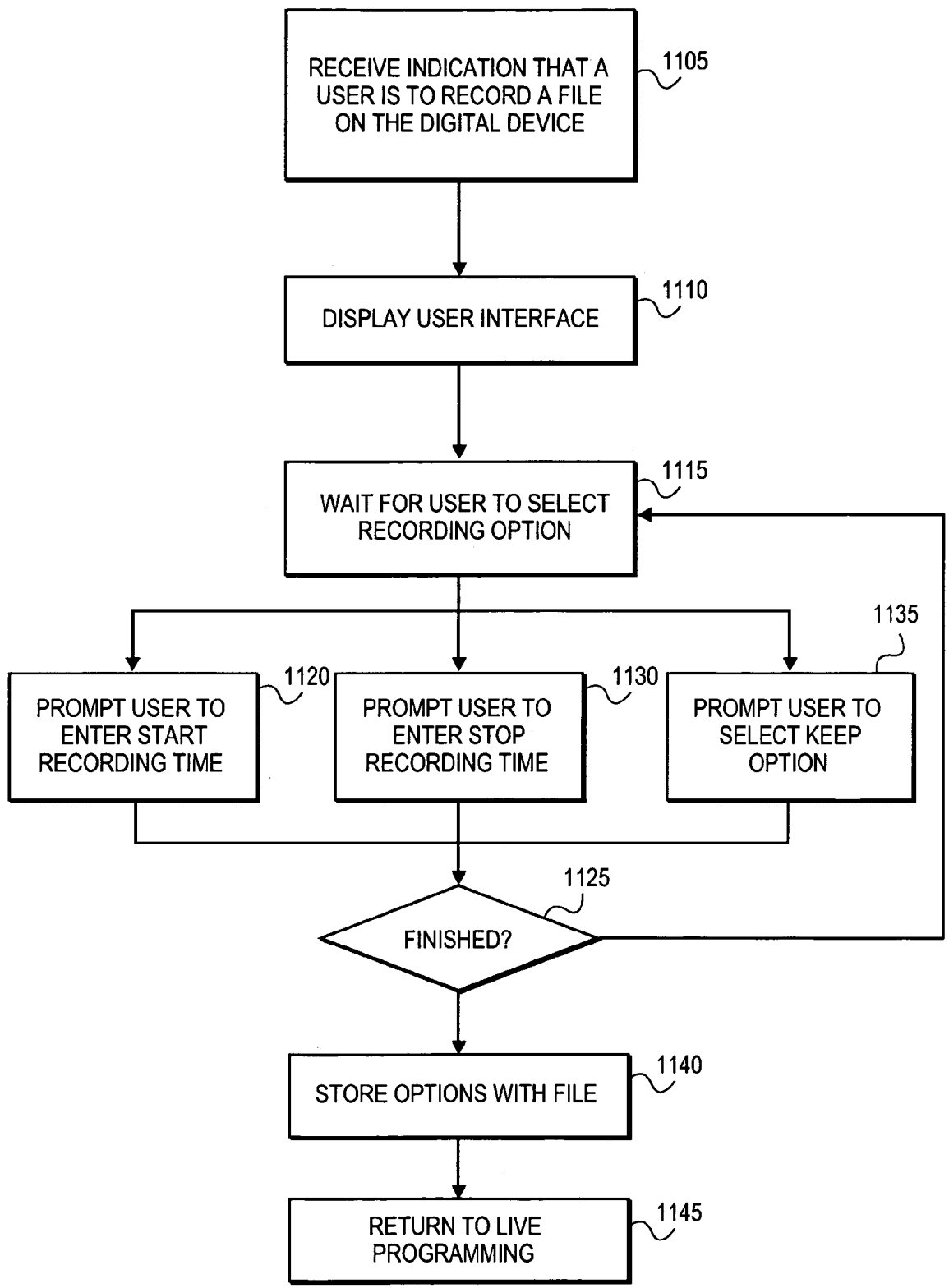
FIG. 11 illustrates a flow diagram for allowing one or more users to access programming recorded on the DVR in accordance with yet another embodiment.

FIG. 11 illustrates a flow diagram 1100 implemented by the DVR 102 in accordance with yet another embodiment of the invention. It should be readily apparent to those of ordinary skill in the art that the flow diagram 1100 depicted in FIG. 11 represents a generalized illustration and that other steps may be added or existing steps may be removed or modified. In general, flow diagram 1100 may be any process for a user to log in to DVR 102 and manipulate or view programs recorded on DVR 102. One example of such a process will now be described with reference to FIG. 11.

As shown in FIG. 11, in step 1105, the DVR 102 may be configured to receive an indication from a user that he is in the process of recording a program into a file. For example, the user may select a program, e.g., a television program, music program, etc., from a user interface that can scroll through the available programs. Alternatively, the user may select a time slot and a channel to record in the future.

In step 1110, the DVR 102 may be configured to display a user interface 500 in response to the activation of recording the selected program. More particularly, the user interface 500 may be configured to provide the capability of a user to customize the recording of the selected program. In step 1115, the DVR 102 may be configured to enter a wait state until the user finishes selecting the recording options for the selected program.

In step 1120, the DVR 102 may have received an indication that the user has selected modifying the start recording time for the selected program. For example, a user may use a remote control device to highlight the start recording field of user interface 500.

In step 1125, after the user has finished inputting the required information, the DVR 102 may be configured to display a dialog box that may query whether or not the user completed with user interface 500. If the user has not finished with user interface 500, the DVR 102 may return to the processing of step 1115. Otherwise, the DVR 102 may proceed to the processing of step 1140, which will be explained in greater detail herein.

In step 1130, the DVR 102 may have received an indication that the user has selected modifying the stop recording time for the selected program. For example, a user may use a remote control device to highlight the start recording field of user interface 500. After the modification has been completed, the DVR 102 may proceed with the processing associated with step 1125.

In step 1135, the DVR 102 may receive an indication that the user wishes to modify the keep field 520 (see FIGS. 5A-5D). For example, a user may use a remote control device to highlight the keep field 520 of user interface 500. In this embodiment, the user may scroll the various options for the keep field 520 as previously discussed herein. After the selection of the keep option, the DVR 102 may proceed to the processing of step 1125.

In step 1140, the DVR 102 may receive an indication that the user has completed with the recording options for the selected program. The DVR 102 may then store the recording options and execute the recording options at the appropriate time and date. Subsequently, in step 1145, the DVR 102 may return to live programming. Alternatively, the DVR 102 may return to the place where the user initiated recording the selected program.

Figure 12:
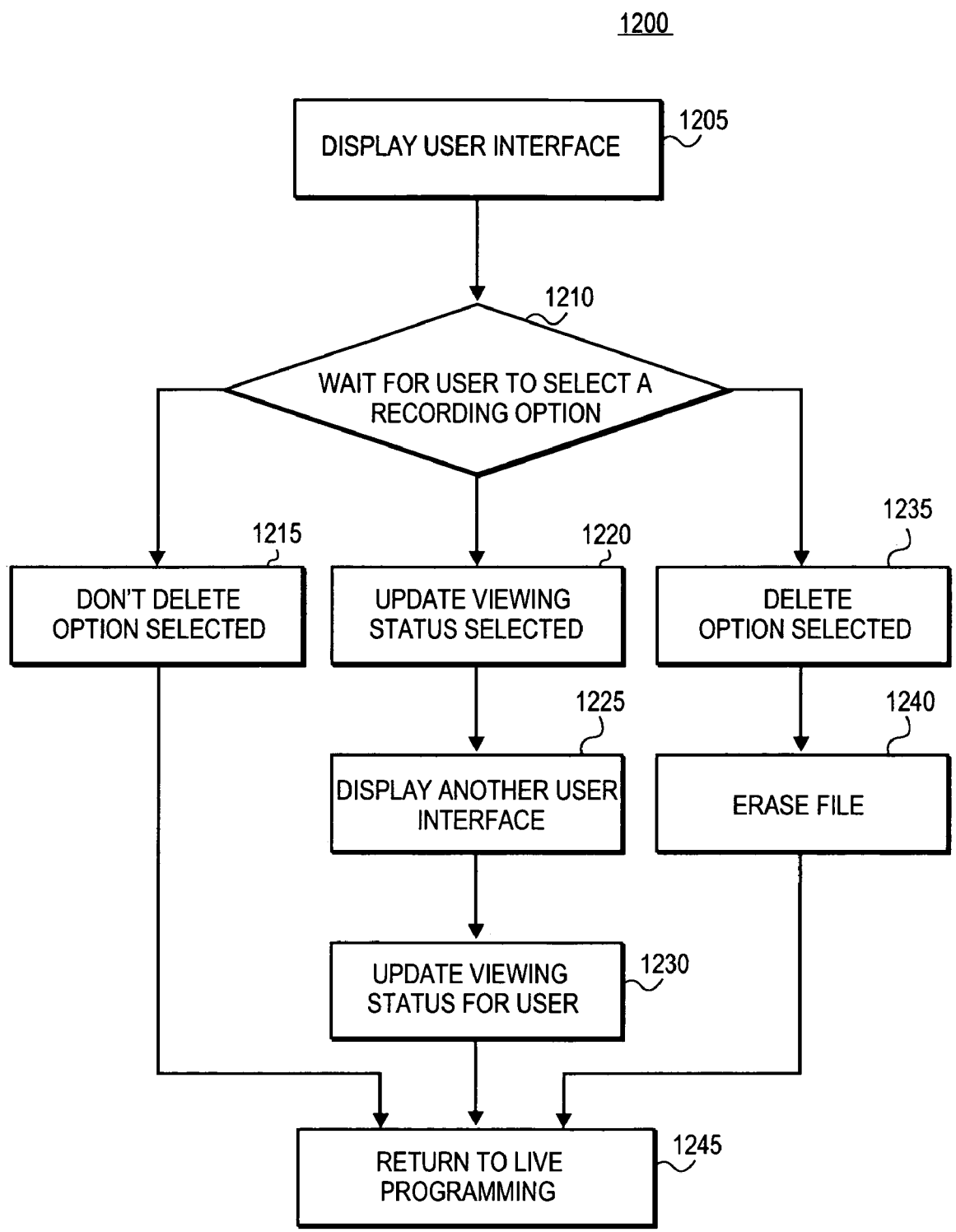
FIG. 12 illustrates a flow diagram for updating the viewing status of programming recorded on the DVR in accordance with yet another embodiment.

FIG. 12 illustrates a flow diagram 1200 implemented by the DVR 102 in accordance with yet another embodiment. It should be readily apparent to those of ordinary skill in the art that the flow diagram 1200 depicted in FIG. 12 represents a generalized illustration and that other steps may be added or existing steps may be removed or modified.

As shown in FIG. 12, in step 1205, the DVR 102 may be configured to display user interface 600. In step 1210, the DVR 102 may be configured to enter a wait state until the user selects a menu option. For example, as previously discussed with respect to FIG. 6, user interface 600 provides a way for the user to select between three menu options: "Update viewing status," "Delete this recording now," or "Don't delete."

If the user selects "Don't delete" menu option, then in step 1215 DVR 102 may be configured to return the file back to the hard disk 220 of the DVR 102. The DVR 102 may then be configured to return to live programming, in step 1245.

Alternatively, if the user selects "Update viewing status" menu option, then in step 1220, the DVR 102 may be configured to display user interface 700. In step 1225, the DVR 102 may be configured to display additional user interfaces or enter a wait state until the user updates the viewing status for the file. Once the user completes the update, in step 1230, the DVR 102 may store the update with the file. The DVR 102 may then be configured to return to live programming, in step 1245.

If the user selects the "Delete this recording now" menu option, then in step 1235, the DVR 102 may be configured to erase the file in step 1240. Subsequently, the DVR 102 may be configured to return to live programming, in step 1245 may be configured to detect the end of a playback of a stored file. More particularly, the DVR 102 may be configured to detect the end-of-file marker associated with the stored file.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method for automatically scheduling the deletion of a plurality of files on a digital playback system, wherein said plurality of files is assigned a plurality of deletion criteria, and a first file among the plurality of files is assigned a first deletion criterion among the plurality of deletion criteria, the method comprising:

logging a plurality of users of the digital playback system;
   displaying a user interface configured to accept user input specifying information about the plurality of users;
   displaying a user interface configured to determine the first deletion criterion for retaining the first file;
   identifying the first file on the digital playback system to be accessed by the plurality of users;
   logging when at least one of the plurality of users has accessed the first file;
   scheduling deletion of the first file based on the first deletion criterion;
   identifying a subset of users among the plurality of users interested in viewing the first file based on the user input specifying information about the plurality of users;
   automatically associating the first file with the subset of users; and
   displaying a user interface configured to identify the subset of users interested in viewing a recorded program of the first file in response to an end of a playback of the first file,
   wherein the first deletion criterion is based on when the at least one of the plurality of users has completed accessing the first file,
   wherein a second file among the plurality of files is assigned a second deletion criterion different from the first deletion criterion,
   wherein said first deletion criterion is assigned to the first file by one of said plurality of users,
   wherein the first deletion criterion indicates that the first file is eligible for deletion when all of the plurality of users have accessed the first file,
   wherein the user specifying information comprises, for each of the plurality of users, a list of files among the plurality of files which each of the plurality of users are interested in viewing, and
   wherein the identifying of the subset of users is performed based on whether content of the files in said list of files is similar to content in said first file.

2. The method according to claim 1, further comprising selecting an option to identify the first file to be viewed by the plurality of users.

3. The method according to claim 2, further comprising logging when each user has completed viewing the file.

4. The method according to claim 1, further comprising selecting at least one user from the subset of users interested in viewing the first file.

5. The method according to claim 1, further comprising recording the first file on the digital playback system from a source.

6. The method according to claim 5, wherein the source is one of a digital video disk player, a videotape player, a compact disk player, and an mp3 player.

7. The method according to claim 1, wherein the first deletion criterion is based on when each of the subset of users interested in viewing the first file has completed accessing the first file.

8. The method according to claim 1, wherein the digital playback system comprises a single digital recorder, and the plurality of users view programs recorded on the single digital recorder.

9. The method according to claim 1, wherein the identifying of the subset of users is performed automatically by the digital playback system.

* * * * *